(12) United States Patent  
Miyazaki

(10) Patent No.: US 9,981,353 B2
(45) Date of Patent: May 29, 2018

(54) MACHINE TOOL FACILITY

(71) Applicant: MAKINO MILLING MACHINE CO., LTD., Tokyo (JP)

(72) Inventor: Masaaki Miyazaki, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 107 days.

(21) Appl. No.: 15/032,547

(22) PCT Filed: Oct. 28, 2013

(86) PCT No.: PCT/JP2013/079164
§ 371 (c)(1),
(2) Date: Apr. 27, 2016

(87) PCT Pub. No.: WO2015/063843
PCT Pub. Date: May 7, 2015

(65) Prior Publication Data
US 2016/0263718 A1    Sep. 15, 2016

(51) Int. Cl.
*B23Q 7/14*       (2006.01)
*B23Q 7/10*       (2006.01)
*B65G 65/00*      (2006.01)
*B23Q 41/02*      (2006.01)

(52) U.S. Cl.
CPC ............. *B23Q 7/1431* (2013.01); *B23Q 7/10* (2013.01); *B23Q 41/02* (2013.01); *B65G 65/00* (2013.01); *B65G 2201/0267* (2013.01)

(58) Field of Classification Search
CPC .......... B23Q 41/02; B23Q 7/10; B65G 65/00; B65G 2201/0267
See application file for complete search history.

(56) References Cited

U.S. PATENT DOCUMENTS

2013/0302128 A1* 11/2013 Miyazaki ............. B23Q 7/1426
                                                414/749.6

FOREIGN PATENT DOCUMENTS

| CN | 2568674 | 8/2003 |
|---|---|---|
| EP | 1731260 B1 | 12/2006 |
| JP | 61-297066 | 12/1986 |
| JP | 4-92745 | 8/1992 |
| JP | 4-360758 | 12/1992 |
| JP | 6-277973 | 10/1994 |

(Continued)

OTHER PUBLICATIONS

International Search Report dated Dec. 10, 2013, directed to International Application No. PCT/JP2013/079164; 2 pages.

*Primary Examiner* — Michael S Lowe
(74) *Attorney, Agent, or Firm* — Morrison & Foerster LLP

(57) ABSTRACT

A machine tool facility includes the following: machine tools; a first pallet stocker in which a plurality of pallets are arranged in parallel with a predetermined space therebetween; a second pallet stocker in which a plurality of pallets are arranged in parallel with a predetermined space therebetween, and which is disposed in parallel with the first pallet stocker; a conveyance car that conveys a pallet in a direction parallel to the row of the pallets of the first pallet stocker; a first transfer device for transferring the pallet between the first pallet stocker and the conveyance car; and a second transfer device for transferring, by horizontal movement, the pallet between the first pallet stocker and the second pallet stocker.

5 Claims, 16 Drawing Sheets

(56) References Cited

FOREIGN PATENT DOCUMENTS

| JP | 2974803 | 9/1999 |
|----|---------|--------|
| JP | 4799423 | 8/2011 |
| WO | WO-2006/059398 | 6/2006 |
| WO | WO-2012/111166 | 8/2012 |

\* cited by examiner

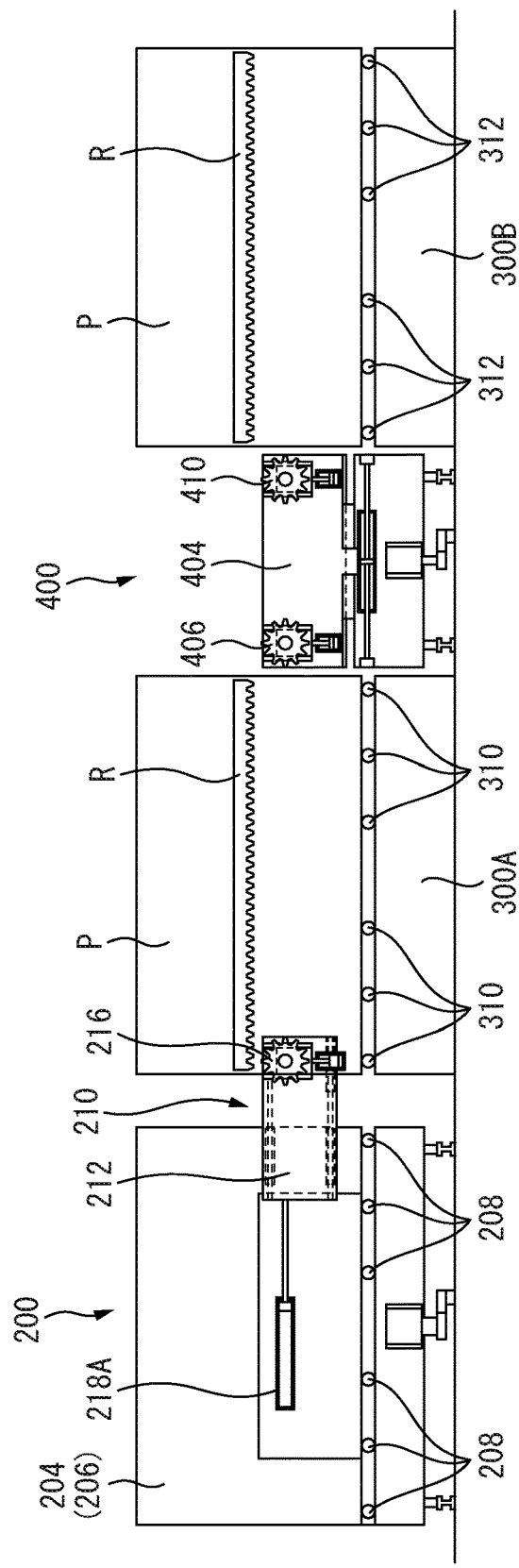

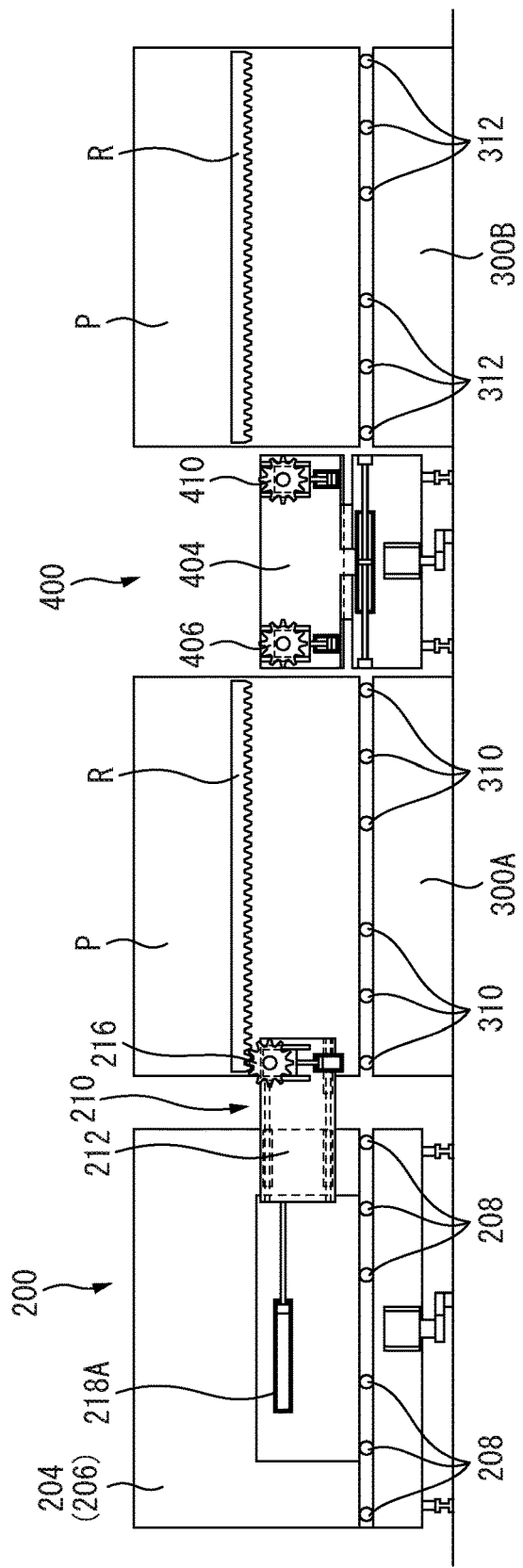

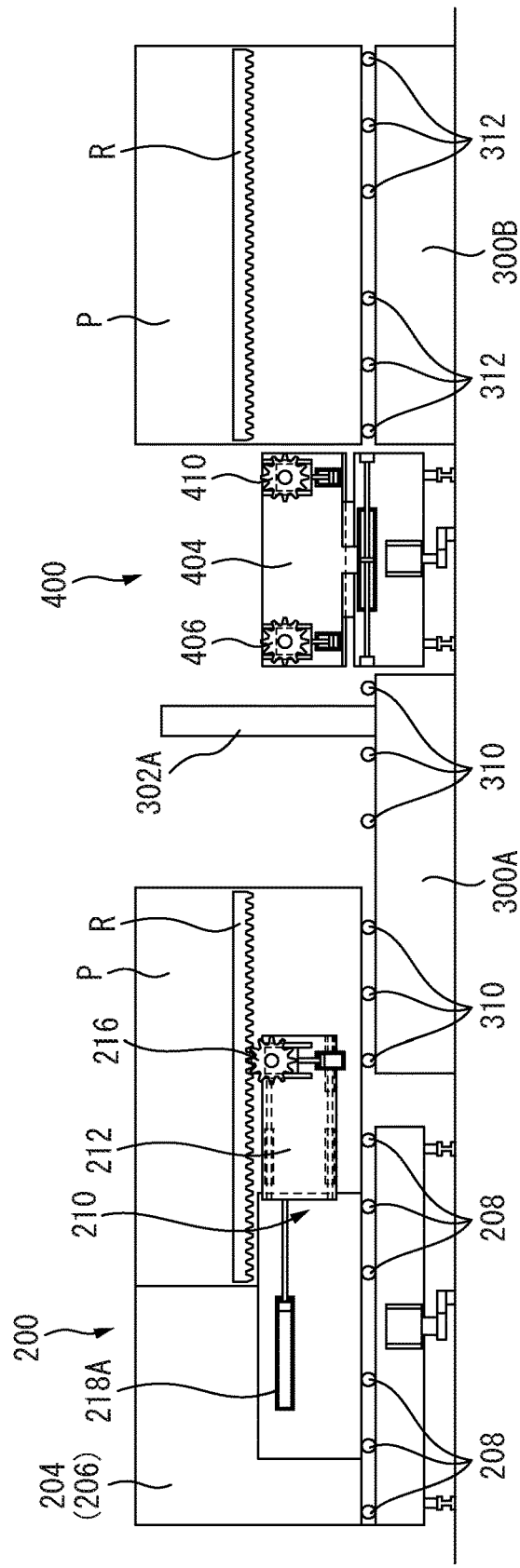

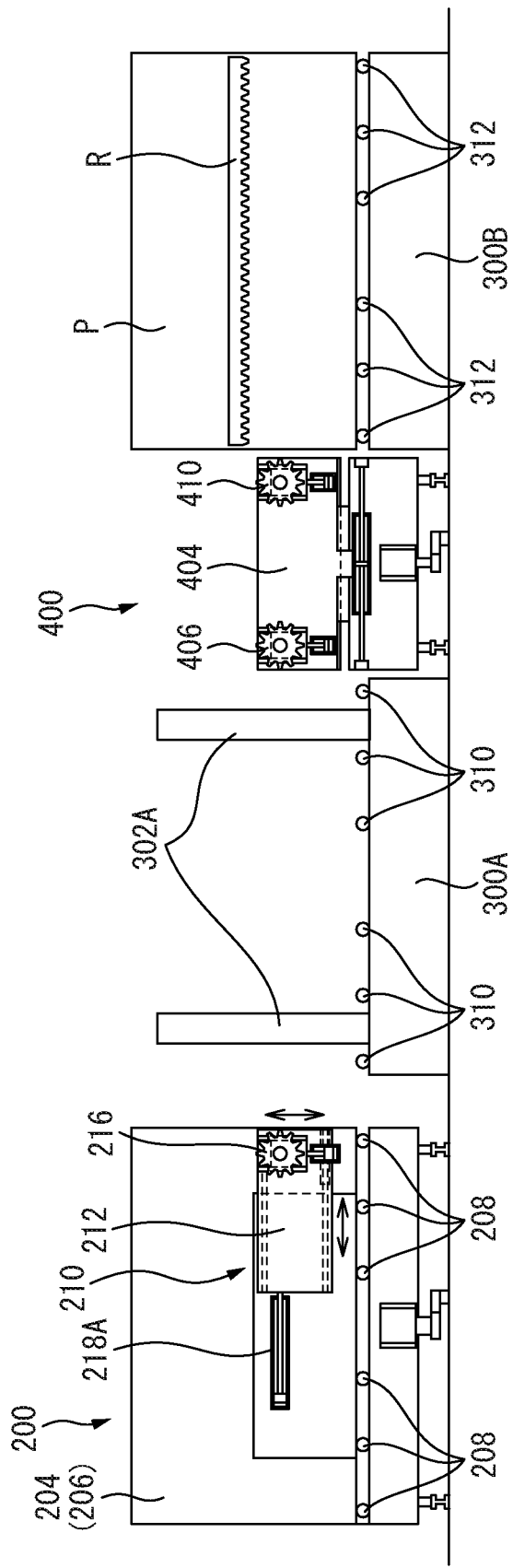

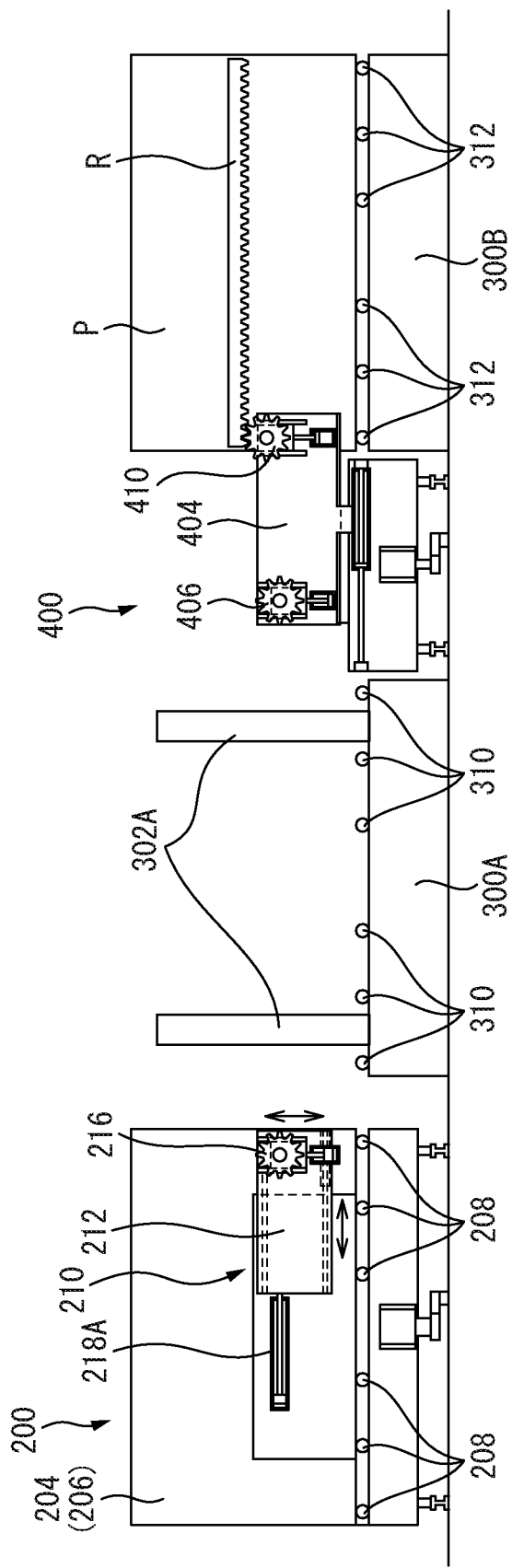

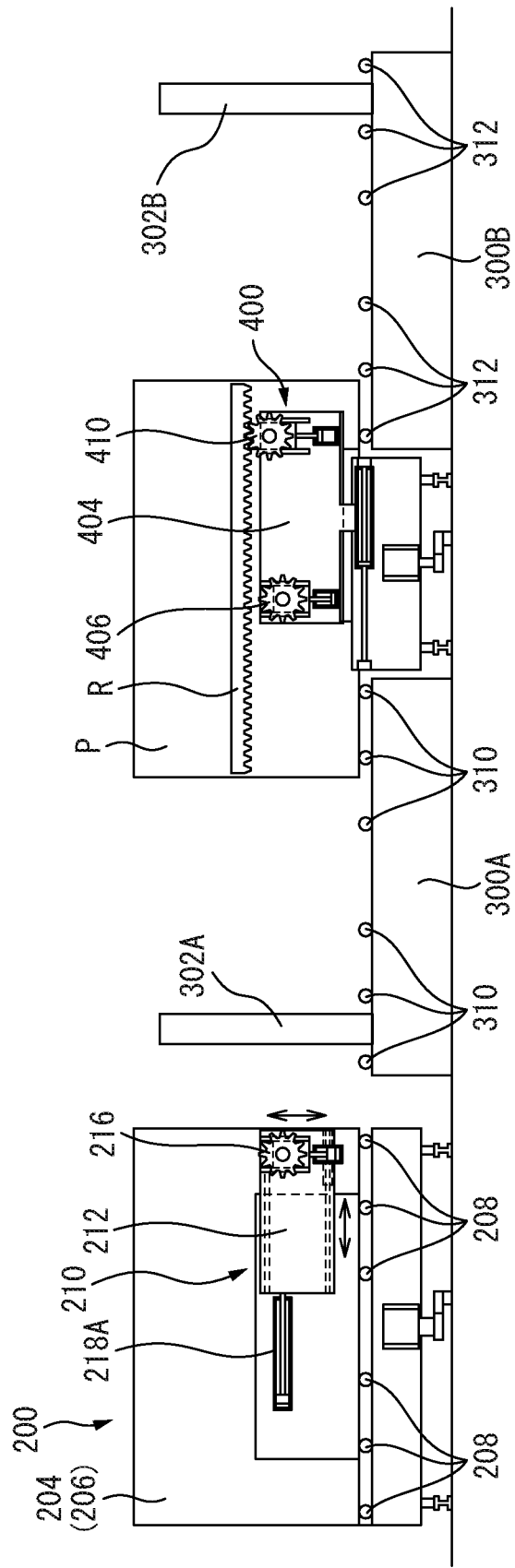

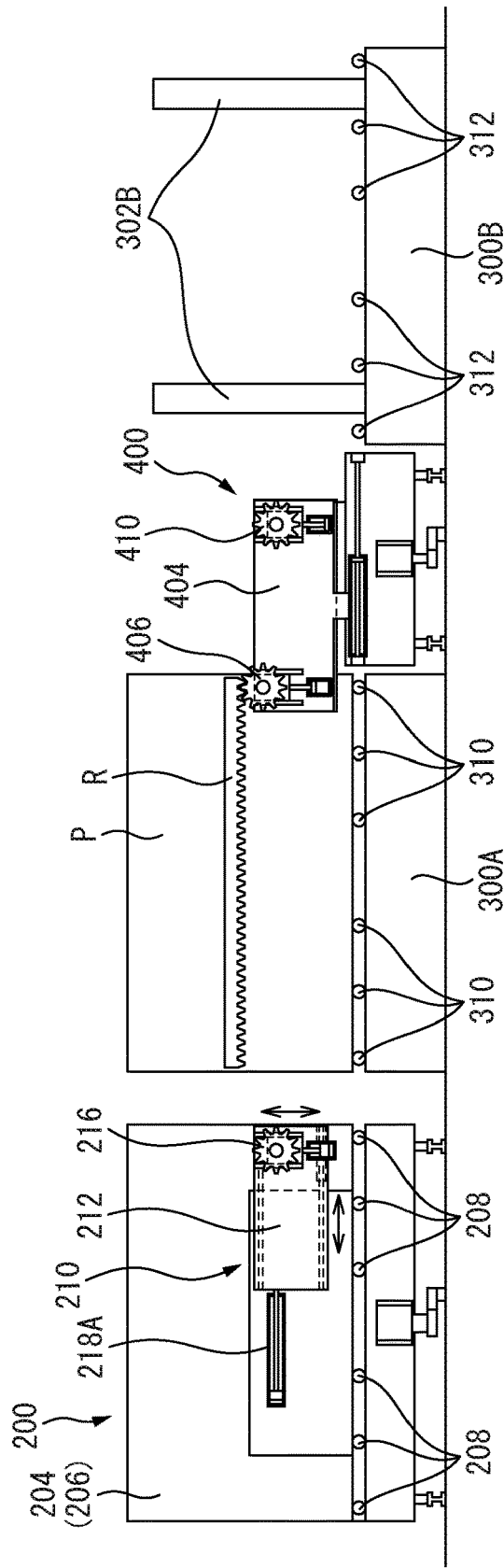

MACHINE TOOL FACILITY

CROSS-REFERENCE TO RELATED APPLICATIONS

This application is a U.S. National Stage patent application of International Patent Application No. PCT/JP2013/079164, filed Oct. 28, 2013, which is hereby incorporated by reference in the present disclosure in its entirety.

FIELD OF THE INVENTION

The invention relates to a machine tool facility provided with one or more machine tools, a pallet stocker for storing a plurality of pallets, a conveyer apparatus for conveying pallets between the machine tools and the pallet stocker.

BACKGROUND OF THE INVENTION

A machine tool facility, provided with a pallet stocker for storing a plurality of pallets to each of which a workpiece is mounted and a pallet changer for changing pallets between machine tools and the pallet stocker, has been known in the art.

For example, PLT 1 describes a machine tool facility provided with a machine tool, which processes a workpiece mounted to a vertically oriented pallet, and a pallet stocker, disposed adjacent the machine tool, for storing a plurality of vertically oriented pallets, and a pallet changer for changing vertically oriented pallets between the machine tool and the pallet stocker.

Further, PLT 2 describes a machine tool facility provided with a stocker adjacent a machine tool, a buffer provided in the stocker, a preparation station attached to the stocker, a carrier mechanism disposed above the stocker for moving reciprocally in the longitudinal direction of the stocker, a lifter mechanism disposed on the carrier mechanism, provided for moving reciprocally in the vertical direction, for holding a pallet, and an operation controller for controlling the carrier mechanism based on the addresses corresponding to the positions of the pallets.

Furthermore, PLT 3 describes a machine tool facility including one or more machine tools, multistage stacking pallet stockers, and a conveyer means for conveying a workpiece.

CITATIONS LIST

PLT 1: Japanese Patent No. 4799423 B2
PLT 2: Japanese Patent No. 2974803 B2
PLT 3: Japanese Patent Publication No. S61-297066 A

SUMMARY OF THE INVENTION

The pallet stocker of the machine tool facility of PLT 1 includes a plurality of vertically oriented pallet mounting faces perpendicular to the rails of the pallet changer. Accordingly, in order to store more pallets, it is necessary to extend the pallet stocker in the direction of the rails of the pallet changer so as to increase the number of the pallet mounting faces. Therefore, according to the configuration of the machine tool facility of PLT 1, a pallet stocker can store limited number of pallets within an area assigned to a machine tool facility.

The pallet stocker of the machine tool facility of PLT 2 stores pallets arranged in two rows wherein the pallets must be lifted by the lifter mechanism in order to move them from one row to the other within the pallet stocker. Therefore, the pallet stocker of PLT 2 must be complex and increased in size, and further it is very difficult to store a large pallet for mounting a large workpiece.

The pallet stocker of the machine tool facility of PLT 3 stores pallets in the form of matrix within a vertical plane. Therefore, according to the machine tool facility of PLT 3, a complex mechanism is necessary to move the pallets in the pallet stocker. Furthermore, it is very difficult for the pallet stocker of PLT 3 to store a large pallet for mounting a large workpiece.

The invention is directed to solve the above-described problems of the prior art, and the objective of the invention is to provide a machine tool facility which can store a large number of pallets effectively within a narrow space without increasing the size of a pallet transferring device.

In order to solve the above-described problem, the invention provides a machine tool facility adapted to convey and transfer pallets between a machine tool and a pallet stocker, characterized by a first pallet stocker adapted to store an array of a plurality of pallets disposed at an interval, a second pallet stocker, arranged parallel to the first pallet stocker, and adapted to store an array of a plurality of pallets disposed at an interval, a carriage for conveying a pallet in the direction parallel to the array of the pallets, a first transferring device for transferring a pallet between the first pallet stocker and the carriage, and a second transferring device for transferring a pallet horizontally between the first pallet stocker and the second pallet stocker.

According to the invention, the configuration of the length of the pallet stockers can be reduced by arranging the second pallet stocker arranged parallel to the first pallet stocker and disposing the second transferring device between the first and second pallet stockers. The machine tool facility can store as many pallets as possible within a narrow free space which does not allow a long pallet stocker to be installed in a factory.

The second transferring device, adapted to transfer pallets between the first pallet stocker and the second pallet stocker, does not necessary to hold a pallet, and therefore a small device can be used even when large pallets are stored.

1, explaining the process for transferring a pallet from the first pallet stocker to the carriage.

Figure 1:
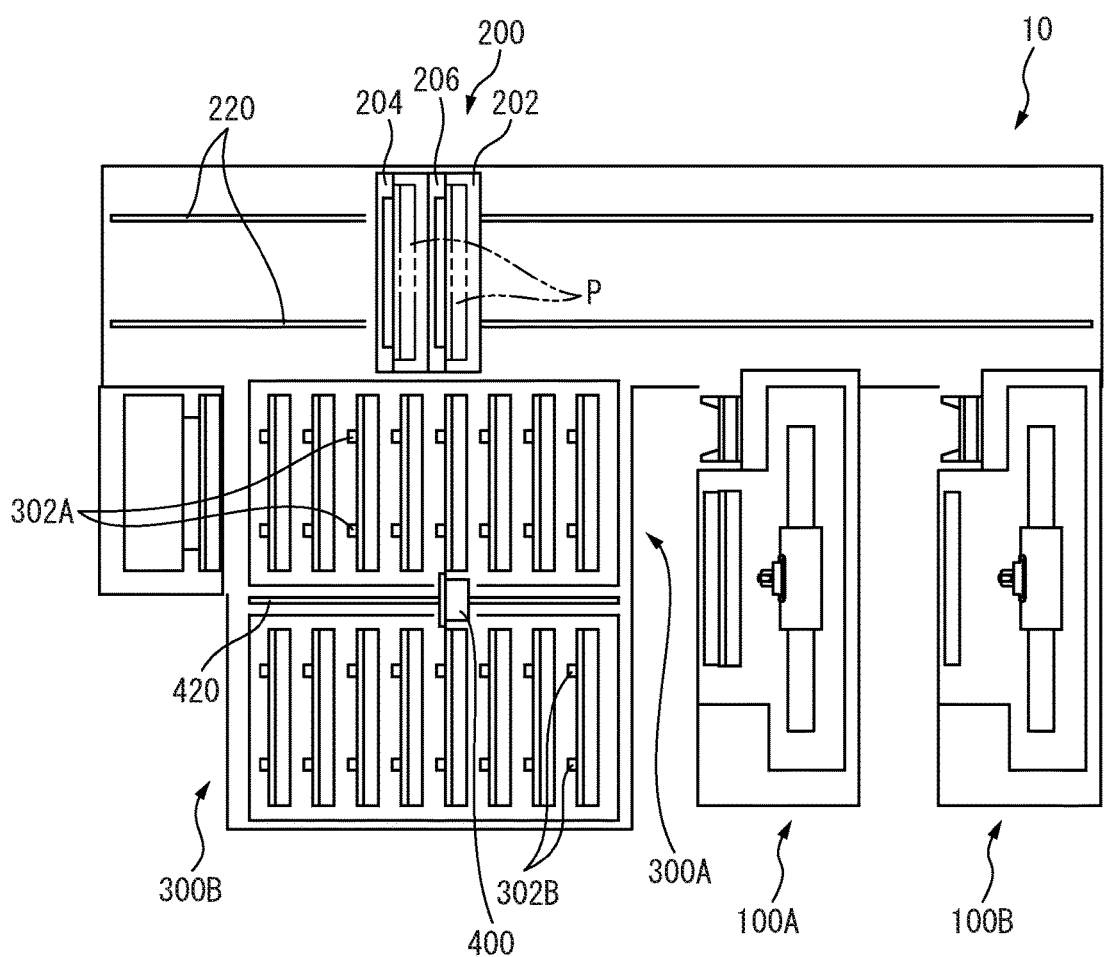
FIG. 1 is a plan view of a machine tool facility according to a preferred embodiment of the invention.
Figure 5A:
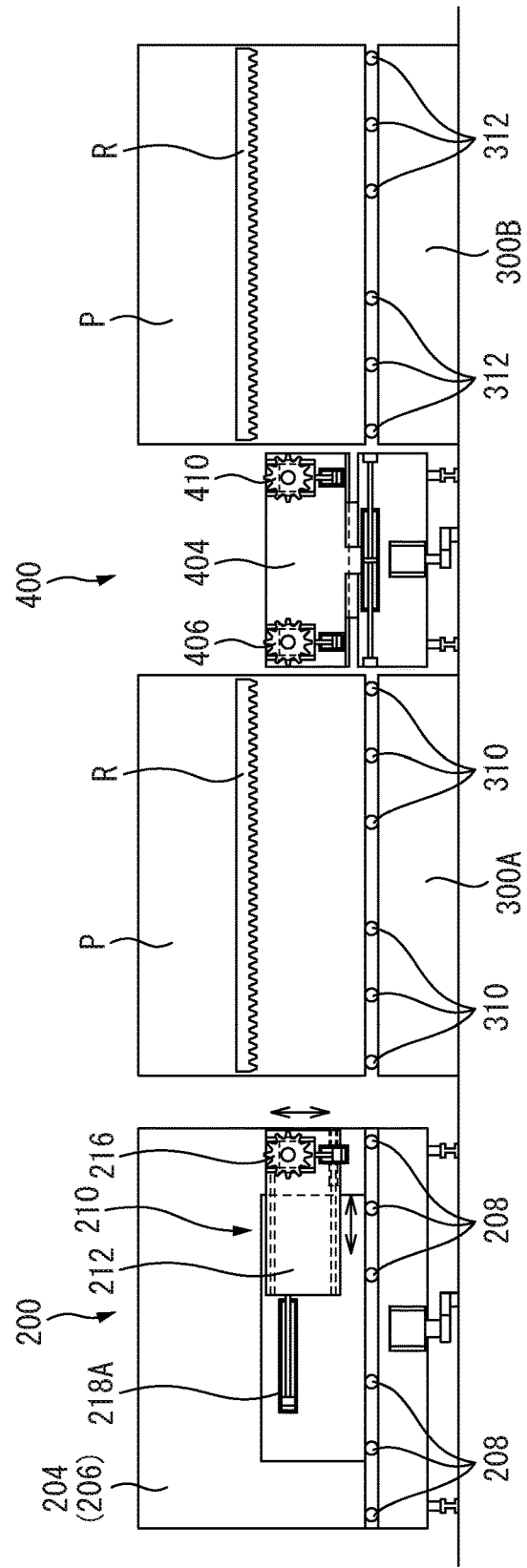
FIG. 5A is a side view of first and second pallet stockers and the carriage of the machine tool facility of FIG. 1, explaining a process for transferring a pallet from the first pallet stocker to the carriage.
Figure 5E:
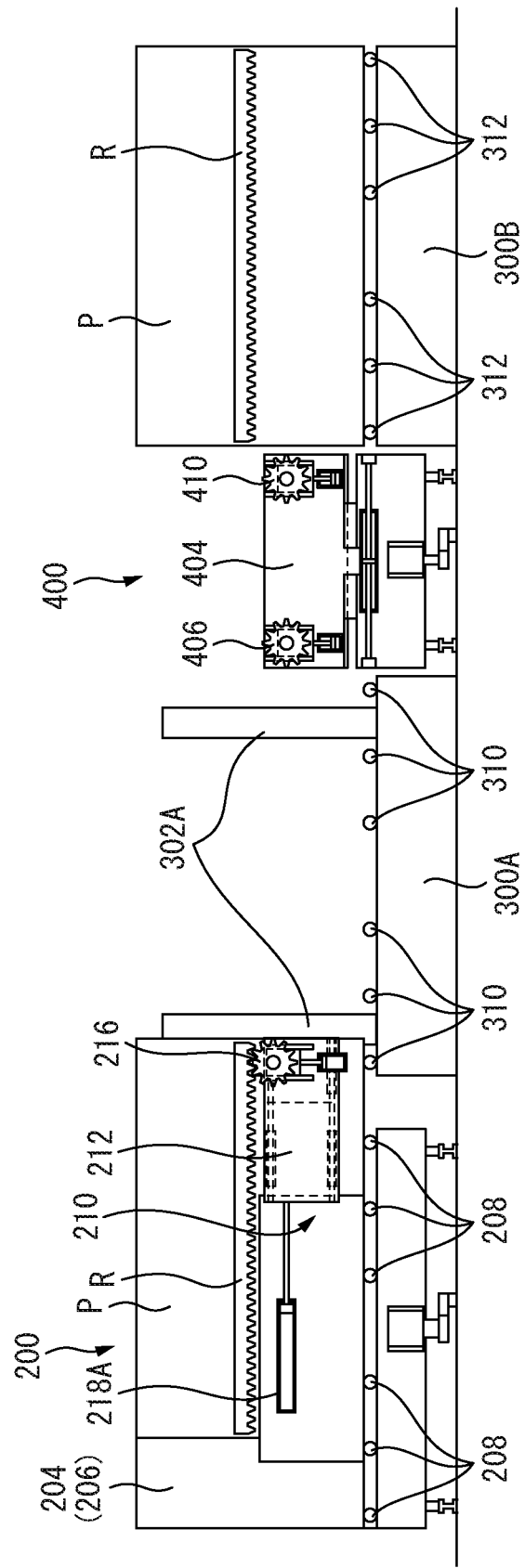
FIG. 5B is a side view of the first and second pallet stockers and the carriage of the machine tool facility of FIG. 1, explaining the process for transferring a pallet from the first pallet stocker to the carriage.
FIG. 5C is a side view of the first and second pallet stockers and the carriage of the machine tool facility of FIG. 1, explaining the process for transferring a pallet from the first pallet stocker to the carriage.
FIG. 5D is a side view of the first and second pallet stockers and the carriage of the machine tool facility of FIG.

FIG. 5E is a side view of the first and second pallet stockers and the carriage of the machine tool facility of FIG. 1, explaining the process for transferring a pallet from the first pallet stocker to the carriage.

Figure 5F:
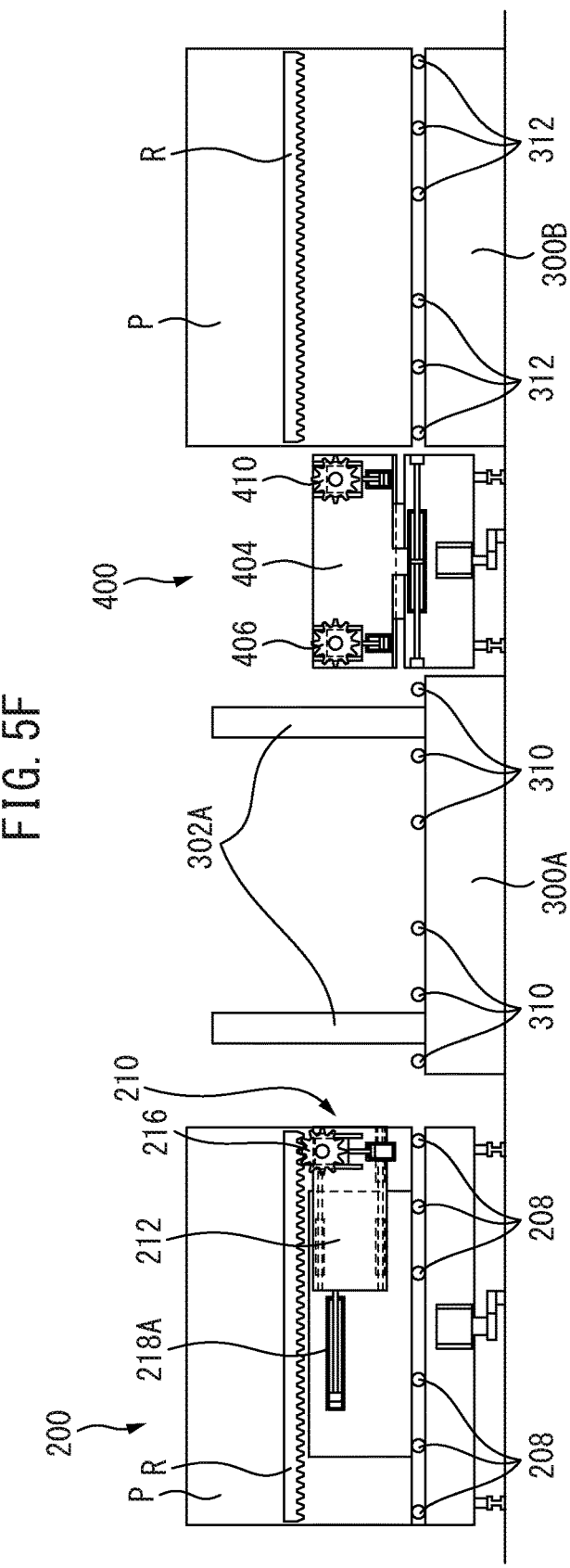

FIG. 5F is a side view of the first and second pallet stockers and the carriage of the machine tool facility of FIG. 1, explaining the process for transferring a pallet from the first pallet stocker to the carriage.

FIG. 6A is a side view of the first and second pallet stockers and the carriage of the machine tool facility of FIG. 1, explaining a process for transferring a pallet from the second pallet stocker to the first pallet stocker.

Figure 6B:
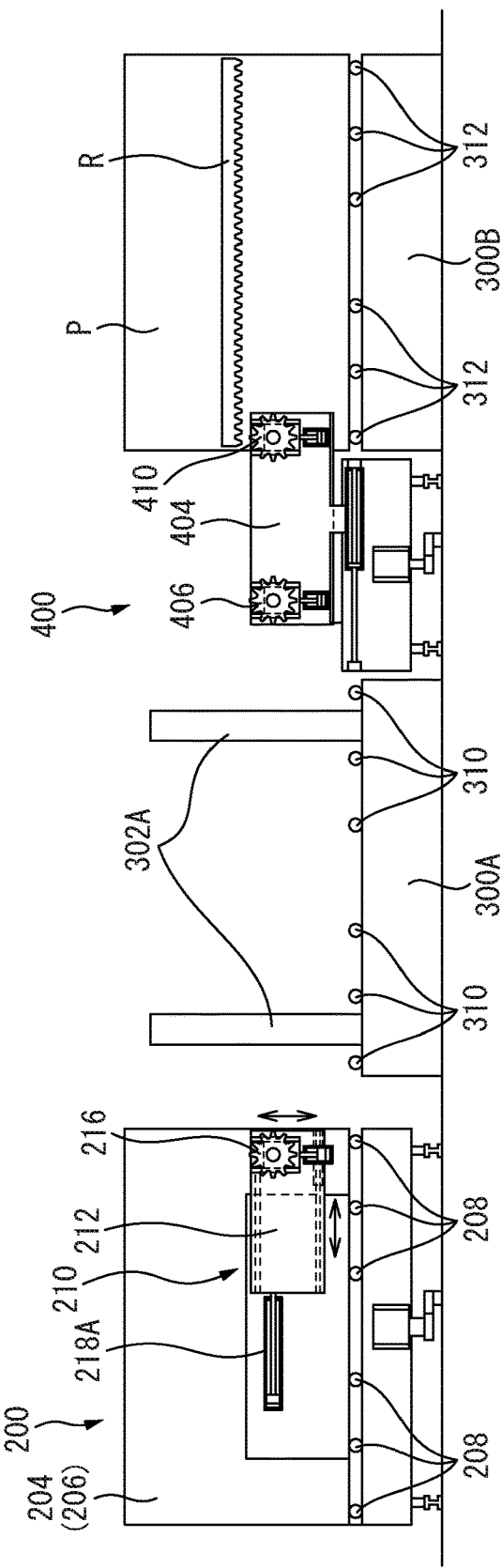

FIG. 6B is a side view of the first and second pallet stockers and the carriage of the machine tool facility of FIG. 1, explaining the process for transferring a pallet from the second pallet stocker to the first pallet stocker.

FIG. 6C is a side view of the first and second pallet stockers and the carriage of the machine tool facility of FIG. 1, explaining the process for transferring a pallet from the second pallet stocker to the first pallet stocker.

FIG. 6D is a side view of the first and second pallet stockers and the carriage of the machine tool facility of FIG. 1, explaining the process for transferring a pallet from the second pallet stocker to the first pallet stocker.

Figure 6E:
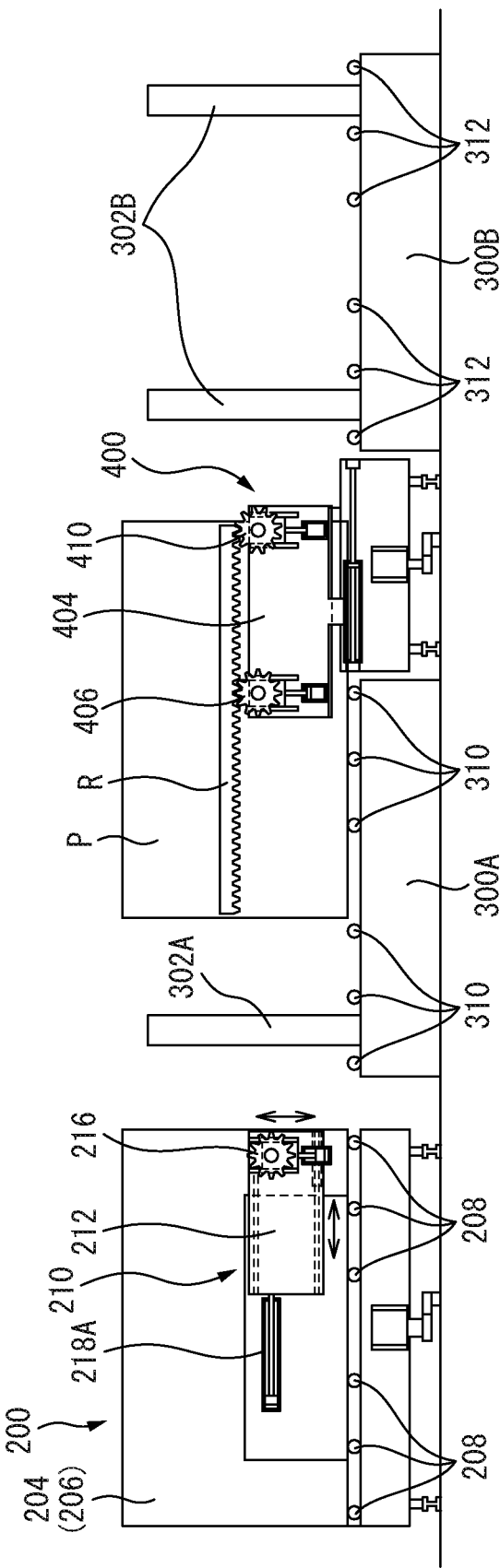

FIG. 6E is a side view of the first and second pallet stockers and the carriage of the machine tool facility of FIG. 1, explaining the process for transferring a pallet from the second pallet stocker to the first pallet stocker.

FIG. 6F is a side view of the first and second pallet stockers and the carriage of the machine tool facility of FIG. 1, explaining the process for transferring a pallet from the second pallet stocker to the first pallet stocker.

DETAILED DESCRIPTION OF THE INVENTION

With reference to the drawings, a preferred embodiment of the invention will be described below.

In FIG. 1, a machine tool facility 10 according to the present embodiment comprises a least one, in this embodiment two machine tools 100A and 100B, first and second pallet stockers 200A and 300B, disposed adjacent one of the machine tools 100A and 100B, a carriage 200 disposed between the machine tools 100A and 100B and the first and second pallet stockers 300A and 300B.

Figure 2:
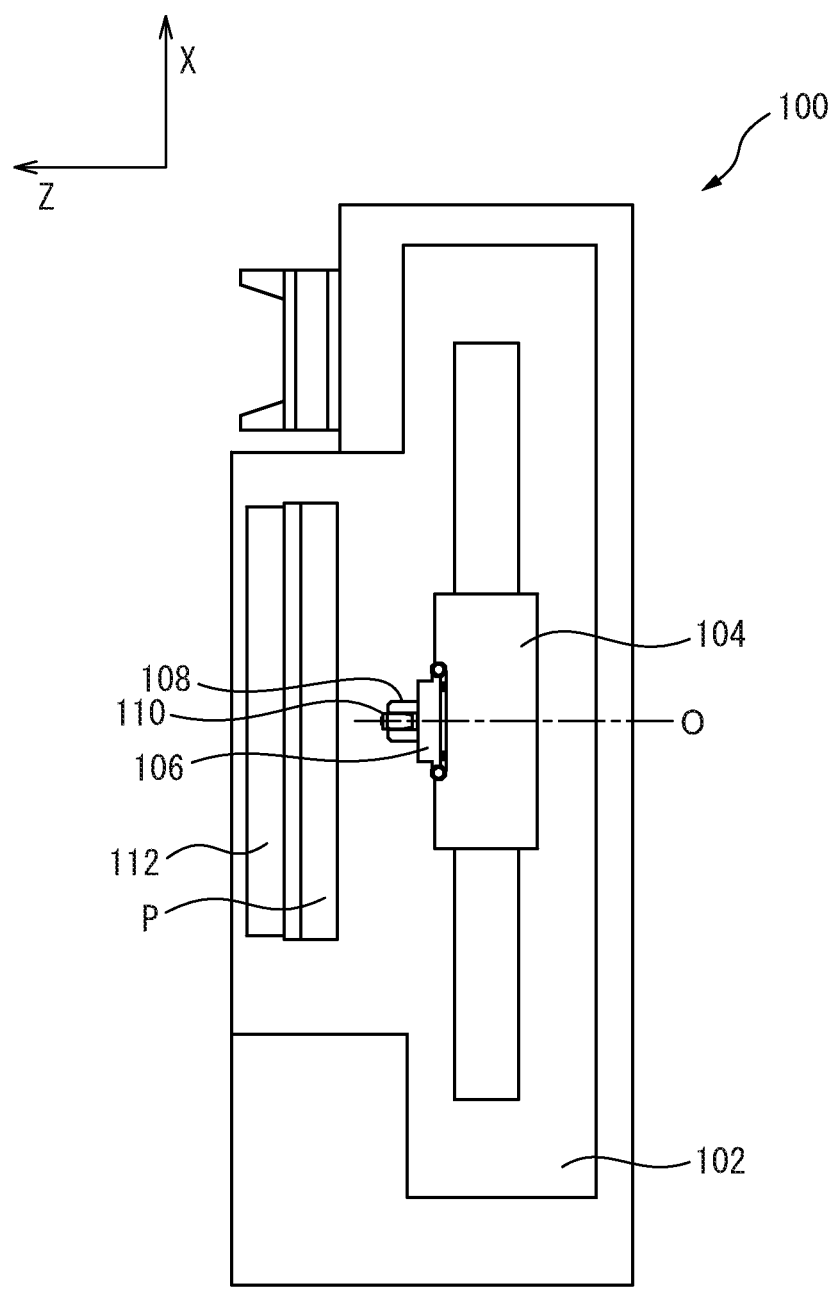
FIG. 2 is a plan view of a machine tool of the machine tool facility of FIG. 1.

In this embodiment, the machine tools 100A and 100B have the same configuration, and therefore with reference to FIG. 2, only the machine tool 100A will be described below.

The machine tool 100A comprises a bed 102, providing a base, a column 104 mounted to the bed 102 for horizontally moving in X-axis direction (the up-and-down direction in FIGS. 1 and 2), a Y-axis slider 106 mounted to the front face of the column 104 for vertically moving in Y-axis direction (perpendicular to the plane of FIGS. 1 and 2), a spindle head 108 mounted to the Y-axis slider 106 for moving in Z-axis direction (left-and-right direction in FIGS. 1 and 2) perpendicularly intersecting the X-axis, a spindle 110 supported by the spindle head 108 for rotation about an axis O parallel to the Z-axis, and a table 112 or a pallet mount 112, disposed so as to face the spindle 110 in the Z-axis direction and having a pallet mounting face to which a pallet P is secured.

Figure 3:
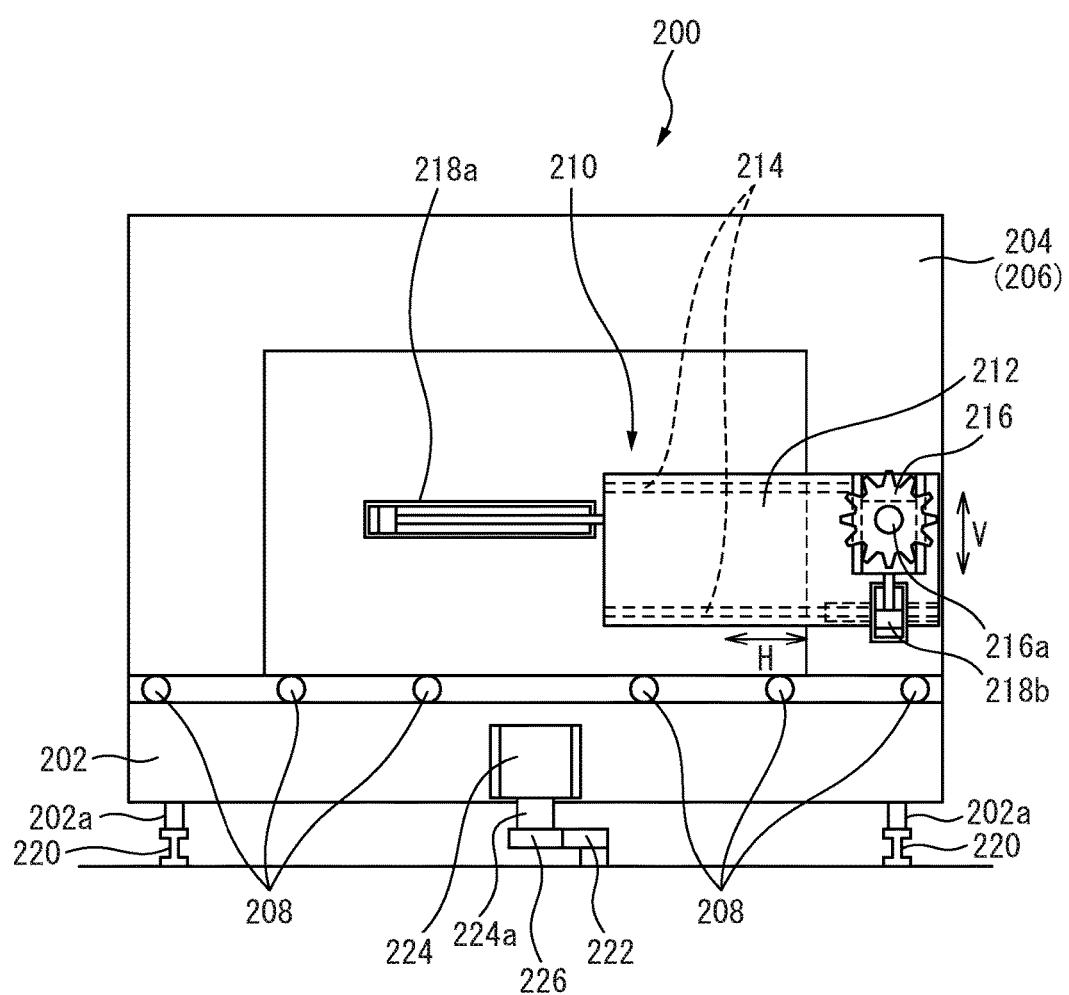
FIG. 3 is a side view of a carriage and a first transferring device of the machine tool facility of FIG. 1.

With reference to FIG. 3, the carriage 200 will be described below.

The carriage 200 comprises a base 202, vertically oriented first and second pallet supports 204 and 206 mounted to the base 202, and a transferring device 210 for transferring a pallet P between the first pallet stocker 300A and the first and second pallet supports 204 and 206. Mounted to the bottom face of the base 202 are a plurality of rollers 202a which roll along a pair of rails 220 extending in the Z-axis direction. A drive pinion 226 and a drive motor 224, for rotationally driving the drive pinion 226, are mounted to the base 202. The drive motor 224 has a vertically oriented output shaft 224a downwardly extending from the bottom face of the base 202. The drive pinion 226 is mounted to the output shaft 224a. The drive pinion 226 engages with teeth of a rack 222 extending in the Z-axis direction between the pair of rails 220.

The first and second pallet supports 204 and 206 are secured to the top face of the base 202 so that they are oriented perpendicularly to the Z-axis of the machine tools 100A and 100B. Accordingly, the workpiece mounting face of a pallet P mounted to each of the pallet mounting faces of the pallet supports 204 and 206 extends vertical. Further, the first and second pallet supports 204 and 206 are provided with a plurality of rollers 208 for engaging the bottom edges of the pallets P mounted to the pallet mounting faces so as to support the pallets P.

Each of the first and second pallet supports 204 and 206 is provided with a transferring device 210. Although FIG. 3 shows only the transferring device 210 mounted to the first pallet support 204, the second pallet support 206 also has a transferring device (not shown) having the configuration the same as the transferring device 210.

The transferring device 210 has a moving bracket 212 mounted to the first pallet support 204 for moving in the X-axis direction of the machine tools 100A and 100B. The pallet mounting face of each of the pallet supports 204 and 206 is provided with guide rails 214 extending in the X-axis direction of the machine tools 100A and 100B. The moving bracket 212 has shoes (not shown) engaging the guide rails 214. A piston rod of a first actuator 218a, such as a pneumatic cylinder or a hydraulic cylinder, is connected to one of the end of the moving bracket 212. Accordingly, the first actuator moves reciprocally the moving bracket 212 along the guide rails 213 in a horizontal direction, i.e., in the X-axis direction of the machine tools 100A and 100B, between an extended position and a retracted position, as shown by an arrow H.

The moving bracket 212 is provided with a pinion 216. The pinion 216 is mounted to an output shaft 216a of a motor (not shown) for rotationally driving the pinion 216. The motor is mounted to the moving bracket 212 for moving vertically, i.e., in the Y-axis direction of the machine tools 100A and 100B, as shown by an arrow V, between an upper position and a lower position. A second actuator 218b, such as a pneumatic cylinder or a hydraulic cylinder, for vertically moving the motor and the pinion 216, is mounted to the moving bracket 212.

With reference to FIG. 1, the first and second pallet stockers 300A and 300B have the same configuration. Further, the first and second pallet stockers 300A and 300B comprise pallet holders 302A and 302B. The pallet holders 302A and 302B of the first and second pallet stockers 300A and 300B are aligned with each other in the X-axis direction of the machine tools 100A and 100B or are disposed in an X-Y plane parallel to the X-Y plane of the first and second machine tools 100A and 100B. Thus, each of the first and second pallet stockers 300A and 300B is configured to store an array of a plurality of pallets P, which are oriented parallel to X-Y plane of the first and second machine tools 100A and 100B and arranged in a row in the Z-axis direction of the first and second machine tools 100A and 100B.

Figure 4:
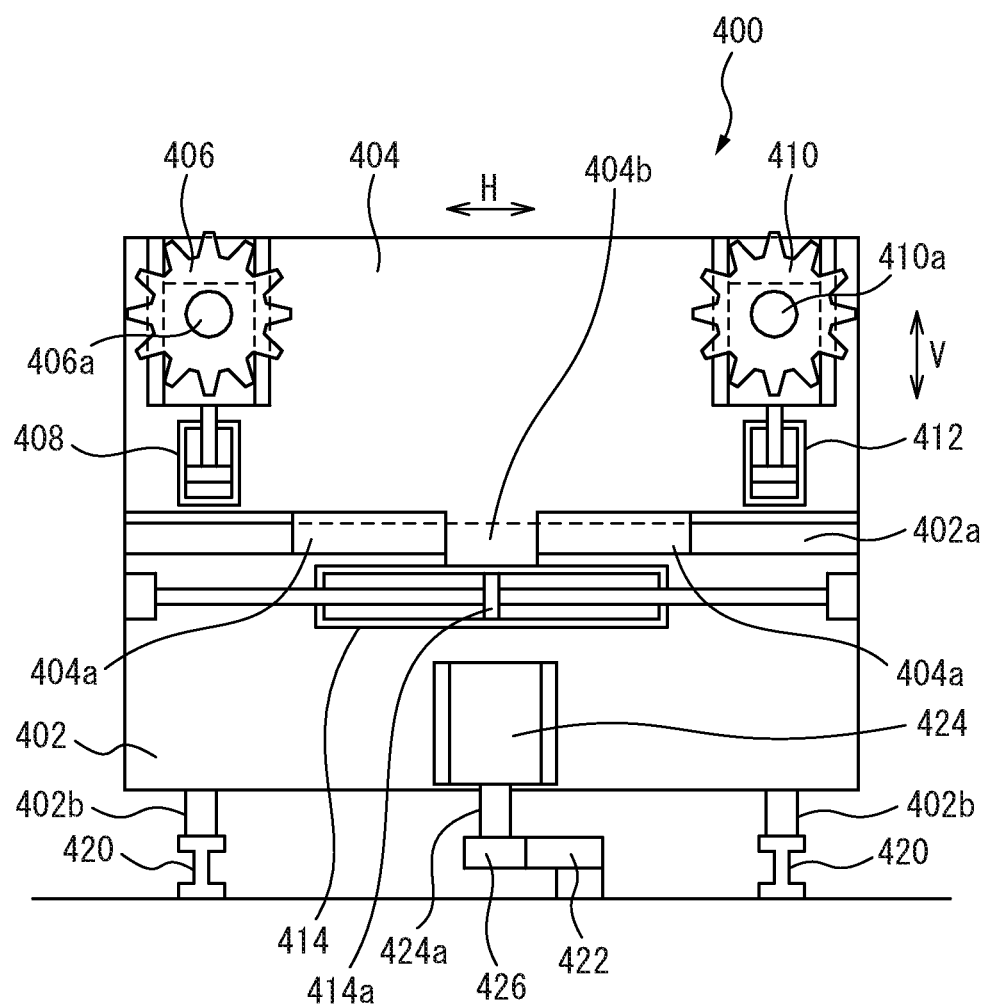
FIG. 4 is a side view of a second transferring device of the machine tool facility of FIG. 1.

Disposed between the first and second pallet stockers 300A and 300B is a second transferring device 400 for transferring a pallet P between the first and second pallet stockers 300A and 300B. With reference to FIG. 4, the second transferring device 400 has a base 402 and a moving bracket 404 mounted to the base 402 for moving reciprocally in the X-axis direction of the first and second machine tools 100A and 100B.

A plurality of rollers 402b is mounted to the bottom face of the base 402 for rolling along a pair of rails 420 extending in the Z-axis direction. A drive pinion 426 and a drive motor 424, for rotationally driving the drive pinion 426, are mounted to the base 402. The drive motor 424 has a vertically oriented output shaft 424a downwardly extending from the bottom face of the base 402. The drive pinion 426 is mounted to the output shaft 424a. The drive pinion 426 engages with teeth of a rack 422 extending in the Z-axis direction between the pair of rails 420. Thus, the second transferring device can reciprocally move, between the first and second pallet stockers 300A and 300B, in the direction parallel to the row of the pallets P, stored in the first and second pallet stockers 300A and 300B.

A guide rail 402a is mounted to the top face of the base 402 so as to extend in the X-axis of the machine tools 100A and 100B. The moving bracket 404 has shoes 404a engaging the guide rails 402a. A piston 414a a first actuator 414, such as a pneumatic cylinder or a hydraulic cylinder, is connected to a bottom part of the moving bracket 404. Accordingly, the first actuator 414 moves reciprocally the moving bracket 404 along the guide rails 402a in a horizontal direction, i.e., in the X-axis direction of the machine tools 100A and 100B, between first and second positions, as shown by an arrow H.

The moving bracket 404 is provided with first and second pinions 406 and 410. The first and second pinions 406 and 410 are mounted to output shafts 406a and 410a of motors (not shown) for rotationally driving the first and second pinions 406 and 410. The motors are mounted to the moving bracket 404 for moving vertically, i.e., in the Y-axis direction of the machine tools 100A and 100B, as shown by an arrow V, between an upper position and a lower position. Second and third actuators 408 and 412, such as a pneumatic cylinder or a hydraulic cylinder, for vertically moving the motors and the first and second pinions 406 and 410, are mounted to the moving bracket 404.

With reference to FIGS. 5A-5F and FIGS. 6A-6F, the operation of the present embodiment will be described and with reference to FIGS. 5A-5F, the operation for transferring a pallet P from the first pallet stocker 300A to the carriage 200 will be described below.

The carriage 200 runs along the rails 220, according to a command from a controlling system for the machine tool facility 10, so as to align one of the pallet supports 204 and 205, at the first pallet stocker 300A, with one of the pallet holders 302A holding a pallet P to be mounted to the carriage 200. At that time, a pallet P is not mounted to the pallet support 204 or 206 which should receive a pallet P from the first pallet stocker 300A.

When the pallet support 204 or 206 is aligned with one of the pallet holders 302A (FIG. 5A), the transferring device 210 is activated whereby the first actuator 218a is extended. This results in moving the bracket 212 horizontally to the extended position (FIG. 5B). At the extended position, the pinion 216 is positioned under the rack R of the pallet P which is held by the first pallet stocker 300A. Then, the second actuator 218b is extended. This moves the pinion 216 vertically upwardly toward the upper position. At the upper position, the pinion 216 engages the teeth of the rack R (FIG. 5C).

When pinion 216 engages the rack R, the pinion 216 is rotationally driven so that the pallet P is drawn from the support rollers 310 of the first pallet stocker 300A and transferred to the support rollers 208 of the carriage 200 (FIG. 5D). When the pallet P is drawn to a position where the pinion 216 engages the end of the rack R, as shown FIG. 5E, the first actuator 218a is retracted so that the moving bracket 212 is moved horizontally toward the retracted position (FIG. 5F). Accordingly, the transferring device 210 moves pallet P from the first pallet stocker completely to the carriage 200 by the engagement between the pinion 216 and rack R.

When a pallet P is moved from the carriage 200 to the first pallet stocker 300A, one of the pallet support 204 and 206, supporting the pallet P, of the carriage 200 is aligned with one of the pallet holders 302A, which should receive the pallet P, thereafter the above described process is carried out in the reverse order.

Further, when a pallet P is transferred from the first machine tool 100A or the second machine tool 100B to the carriage 200, the process shown in FIGS. 5A-5F is similarly carried out. Furthermore, it should be understood that when a pallet P is moved from the carriage 200 to the first machine tool 100A or the second machine tool 100B the process shown in FIGS. 5A-5F is inversely carried out.

With reference to FIGS. 6A-6F, the process for transferring a pallet P from the second pallet stocker 300B to the first pallet stocker 300A will be described below.

The controlling system for the machine tool facility 10 confirms that there is no pallet P held by the pallet holder 302A of the first pallet stocker 300A corresponding to the pallet holder 302B, holding the pallet P to be transferred, of the second pallet stocker 300B. Then, the second transferring device 400 is aligned with the pallet holder 302B, holding the pallet P to be transferred, and the pallet holder 302A which should receive the pallet P (FIG. 6A). Accordingly, the second transferring device 400 is placed between the first and second pallet stocker 300A and 300B at a position, allowing the first and second pinions 406 and 410 to engage the rack R, provided on the back side of the pallet P, held by the pallet stocker 302B.

Then, the first actuator 414 of the second transferring device 400 is activated whereby the moving bracket 404 is moved horizontally toward the second position (FIG. 6B). At the second position, the second pinion 410 is positioned under the rack R of the pallet P held by the second pallet stocker 300B. Then, the third actuator 412 is extended. This results in the second pinion 410 moved vertically upwardly toward the upper position. At the upper position, the second pinion 410 engages the teeth of the rack R (FIG. 6C).

When the second pinion 410 engages the rack R, the second pinion 410 is rotationally driven whereby the pallet P is moved from the second pallet stocker 300B toward the first pallet stocker 300A. At the same time, the second actuator 408 is extended. This results in moving the first pinion 406 vertically upwardly toward the upper position. In this state, when the second pinion 410 is rotated, the rack R engages both the first and second pinions 406 and 410. Then, the pallet P is drawn further by both the first and second pinions 406 and 410 (FIG. 6D). This results in the pallet P being moved onto the support rollers 310 of the first pallet stocker 300A from the support rollers 312 of the second pallet stocker 300B.

As shown in FIG. 6E, when the pallet P is moved to a position where the second pinion 410 engages the end of the rack R, the first actuator 414 is extended in the opposite direction whereby the moving bracket 404 is moved horizontally toward the first position (FIG. 6F). Then, the first pinion 406 is further rotated whereby the pallet P is transferred to the first pallet stocker 300A. Accordingly, the transferring device 400 moves the pallet P to the first pallet stocker 300A completely from the second pallet stocker 300B by the engagement between the first and second pinions 406 and 410 and the rack R.

It should be understood that a pallet P can be transferred from the first pallet stocker 300A to the second pallet stocker 300B by carrying out the above described process in the reverse order.

Although in the above described embodiment, rack and pinion(s) are used, a combination of chain and sprockets may be used.

The present invention enables more pallets to be stored in a narrow space. In particular, when the machine tools and the pallet stockers are arranged parallel and next to each other, the advantageous merit of the invention is maximized, as shown in the above described embodiment. In case of a single row type pallet stocker, a dead space will be defined due to the difference in widths of the pallet stocker and the machine tool. The machine tool is provided with a feed axis having a stroke substantially the same as the length of a pallet. Therefore, the width of the machine tool is twice of the length of the pallet stocker. Accordingly, the pallet stocker, having first and second rows, arranged parallel and next to the machine tool(s), allows the machine tool facility to be installed in a rectangular space, minimizing the dead space.

REFERENCE SIGNS LIST

100A Machine Tool
100B Machine Tool
200 Carriage
204 First Pallet Support
206 Second Pallet Support
208 Support Roller
210 Transferring Device
212 Moving Bracket
216 Pinion
218a First Actuator
218b Second Actuator
300A First Pallet Stocker
300B Second Pallet Stocker
302A Pallet Holder
302B Pallet Holder
310 Support Roller
312 Support Roller
400 Second Transferring Device
404 Moving Bracket
406 First Pinion
410 Second Pinion

The invention claimed is:

1. A machine tool facility adapted to convey and transfer pallets for a machine tool, the facility comprising:
   a first pallet stocker adapted to store an array of a plurality of pallets disposed at an interval, the first pallet stocker having supporting rollers for supporting a pallet;
   a second pallet stocker, arranged parallel to the first pallet stocker, and adapted to store an array of a plurality of pallets disposed at an interval, the second pallet stocker having supporting rollers for supporting the pallet;
   a carriage for conveying the pallet along a rail extending between the machine tool and the first pallet stocker in a direction parallel to the arrays of the pallets, the carriage having supporting rollers for supporting the pallet;
   a first transferring device for transferring the pallet from the supporting rollers of the first pallet stocker to the supporting rollers of the carriage, the first transferring device having a moving bracket mounted to the carriage and configured to move in a horizontal direction perpendicular to the extending direction of the rail; and
   a second transferring device for transferring the pallet horizontally from the supporting rollers of the second pallet stocker to the supporting rollers of the first pallet stocker, the second transferring device having a base configured to move along a rail extending parallel to the rail for the carriage, and a moving bracket mounted to the base and configured to move in the horizontal direction perpendicular to the extending direction of the rails.

2. The machine tool facility of claim 1, wherein the carriage has a base adapted to move along the rail, and first and second pallet supports provided on a top face of the base, and
   wherein each of the first and second pallet supports is adapted to support a pallet parallel to pallets held by the first and second pallet stockers.

3. The machine tool facility of claim 1, wherein the first transferring device is provided on the carriage.

4. The machine tool facility of claim 1, wherein a rack is attached to a back side of the pallet, and
   wherein the first transferring device comprises a pinion, mounted to the moving bracket for moving vertically, the pinion having teeth engageable with teeth of the rack of the pallet.

5. The machine tool facility of claim 1, wherein a rack is attached to a back side of the pallet, and
   wherein the second transferring device comprises first and second pinions, mounted to the moving bracket for moving vertically, the pinions having teeth engageable with teeth of the rack of the pallet.

* * * * *